(12) United States Patent
Wells et al.

(10) Patent No.: US 8,212,828 B2
(45) Date of Patent: Jul. 3, 2012

(54) HYBRID MULTIPLE BIT-DEPTH VIDEO PROCESSING ARCHITECTURE

(75) Inventors: Aaron G. Wells, Piedmont, CA (US); Hidetaka Magoshi, Palo Alto, CA (US); Ho-Ming Leung, Cupertino, CA (US)

(73) Assignee: LSI Corporation, Milpitas, CA (US)

( * ) Notice: Subject to any disclaimer, the term of this patent is extended or adjusted under 35 U.S.C. 154(b) by 1115 days.

(21) Appl. No.: 11/325,291

(22) Filed: Jan. 4, 2006

(65) Prior Publication Data

US 2007/0153013 A1 Jul. 5, 2007

(51) Int. Cl.
*G06T 1/60* (2006.01)
(52) U.S. Cl. .......................................... 345/530; 710/22
(58) Field of Classification Search .................. 345/530; 710/22
See application file for complete search history.

(56) References Cited

U.S. PATENT DOCUMENTS

| | | | | |
|---|---|---|---|---|
| 4,730,223 | A | * | 3/1988 | Ikeda et al. .................. 386/112 |
| 5,081,450 | A | * | 1/1992 | Lucas et al. .................. 345/615 |
| 6,239,815 | B1 | * | 5/2001 | Frink et al. .................. 345/502 |
| 6,573,846 | B1 | * | 6/2003 | Trivedi et al. .................. 341/67 |
| 6,636,222 | B1 | * | 10/2003 | Valmiki et al. ................ 345/505 |
| 6,792,047 | B1 | * | 9/2004 | Bixby et al. ............ 375/240.26 |
| 6,865,638 | B1 | * | 3/2005 | Chatterjee .................... 710/307 |
| 2002/0163913 | A1 | * | 11/2002 | Oh ................................ 370/392 |
| 2004/0056864 | A1 | * | 3/2004 | Valmiki et al. ................ 345/531 |
| 2004/0196291 | A1 | * | 10/2004 | Porchet et al. ................ 345/543 |
| 2005/0210182 | A1 | * | 9/2005 | MacInnis ...................... 711/100 |

* cited by examiner

*Primary Examiner* — Maurice L McDowell, Jr.
(74) *Attorney, Agent, or Firm* — Christopher P. Maiorana, PC

(57) ABSTRACT

An apparatus including a processor and a memory. The processor may be configured to process pixel data comprising eight or more bits. For pixel data having bit-depths greater than eight bits, a number of most significant bits (MSBs) of a pixel are presented as a first byte and a number of least significant bits (LSBs) of the pixel are packed with LSBs from one or more other pixels into a second byte. The memory may be coupled to the processor and configured to store the first byte in response to a first pointer and the second byte in response to a second pointer. The first byte and the second byte are stored independently in the memory.

20 Claims, 4 Drawing Sheets

(A)

(B)

(A)

(B)

HYBRID MULTIPLE BIT-DEPTH VIDEO PROCESSING ARCHITECTURE

FIELD OF THE INVENTION

The present invention relates to a video processing architecture generally and, more particularly, to a hybrid multi-depth (8-bit/multi-bit) video processing architecture.

BACKGROUND OF THE INVENTION

Conventional video processing is restricted to 8-bit when video compression and de-compression (as defined by existing standards such as MPEG-2, MPEG-4, and H.264) are involved. Conventional digital video, whether in YUV or RGB format, represented in an 8-bit format works well with digital circuitry and memory that access data in chunks of 8 bits (i.e., bytes). However, new generation display technology, such as LCD or Plasma, use more bit-depth to provide a higher contrast range and deeper dynamic range.

Conventional techniques for video processing include (i) restricting all video to 8-bit and sacrificing video quality, (ii) storing each pixel with multiple bytes and (iii) making every memory access 10-bit or wider. Making every access 10-bit or wider wastes memory bandwidth when only 8-bit data is used for MPEG. Storing multiple bytes per pixel wastes memory space. Other disadvantages of the conventional techniques can include complex logic for extracting 8-bit data from multi-bit data, and quantization noise and artifacts on the display unit.

It would be desirable to have a system that can efficiently handle a mixture of video precision.

SUMMARY OF THE INVENTION

The present invention concerns an apparatus including a processor and a memory. The processor may be configured to process pixel data comprising eight or more bits. For pixel data having bit-depths greater than eight bits, a number of most significant bits (MSBs) of a pixel are presented as a first byte and a number of least significant bits (LSBs) of the pixel are packed with LSBs from one or more other pixels into a second byte. The memory may be coupled to the processor and configured to store the first byte in response to a first pointer and the second byte in response to a second pointer. The first byte and the second byte are stored independently in the memory.

The objects, features and advantages of the present invention include providing a hybrid multi-depth (8-bit/multi-bit) video processing architecture that may (i) handle 8-bit/multi-bit data efficiently, (ii) make optimal use of memory bandwidth, (iii) eliminate quantization noise or artifact when displaying 8-bit video on a multi-bit display panel, (iv) be used in non television or DVD applications such as hand-held video players and/or (v) provide for future expansion.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may address several problems with conventional techniques including memory bandwidth optimization, memory access latency minimization, random access support, and future growth support. In general, an important resource in a digital video system is memory bandwidth. Since memory bandwidth is important, enabling 8-bit data access within a higher resolution data structure is desirable. For example, if a video display uses 12-bit data, the most significant 8 bits may be accessed by a video compression engine while the whole 12 bits are accessed by the display processing unit. The video compression engine accesses only the data to be compressed rather than accessing the whole 12 bits and throwing away the extra 4 bits of data. Otherwise, 25% of the memory bandwidth is wasted.

The present invention may minimize memory access latency by allowing access to data without pre-processing the data structure. For example, in the 12-bit video system example, hardware in accordance with the present invention may be configured to read 8-bit data rather than reading 12-bit data, re-assembling and re-packing the 12-bit data in 8-bit fashion and sending the 8-bit data to an 8-bit processing unit.

The present invention may provide random access support. In a video processing application (e.g., a pan and scan display of a 16:9 video image on a 4:3 LCD display panel) sub-window video data may be read or written. Multi precision video data may make calculating pixel boundaries difficult for the hardware. The display window may be moved from frame to frame (e.g., as in a DVD play back system). The present invention generally manages the video data structure with two independent pointers. A first pointer may be implemented for accessing a first buffer storing the 8-bit MSBS of each pixel. A second pointer may be implemented for accessing a second buffer storing packed LSB data for two or more pixels. The 8-bit MSB of each pixel is on a byte boundary, and the 4-bit LSB (for 12-bit/pixel) data of two pixels is on a byte boundary also. The present invention eases the calculation of byte addresses of source and destination for a transfer.

The present invention may provide support for a future growth path. The industry is moving from 8-bit, to 10-bit, to 12-bit processing. The present invention generally provides a new data structure that may be easily adapted without major re-design work.

Figure 1:
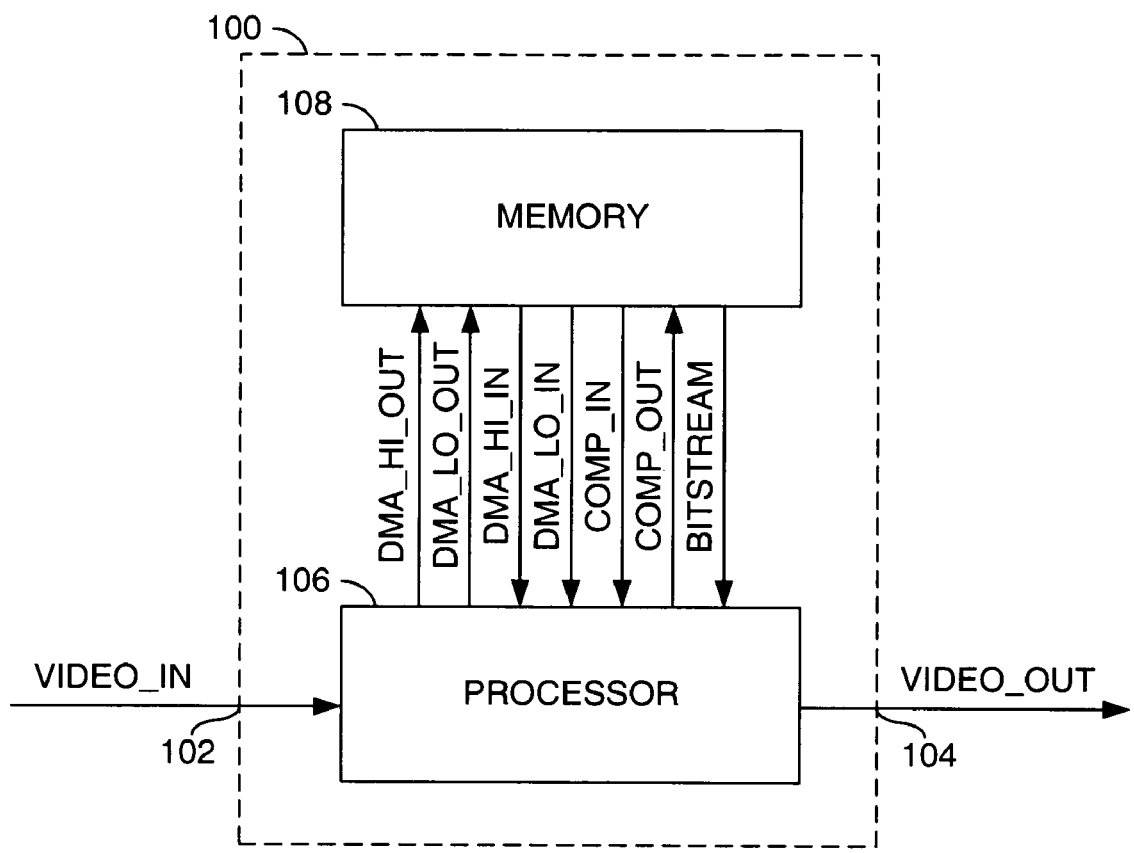
FIG. 1 is a block diagram illustrating a multi-precision data path in accordance with preferred embodiments of the present invention.

Referring to FIG. 1, a block diagram is shown illustrating a circuit 100 in accordance with a preferred embodiment of the present invention. In one example, the circuit 100 may be implemented as a multi-precision data path. In one example, the circuit 100 may be implemented as part of a video processing system. In general, the circuit 100 may be configured to handle a mixture of video precision (e.g., bit-depths). For example, the circuit 100 may be configured to handle a variety of video bit-depths (e.g., 8-bit, 10-bit, 12-bit, etc.).

The circuit 100 may have an input 102 that may receive a signal (e.g., VIDEO_IN) and an output 104 that may present a signal (e.g., VIDEO_OUT). The signal VIDEO_IN may comprise, in one example, a multi-bit (e.g., 8-bit or other bit-depth) data stream. In one example, the signal VIDEO_IN may comprise a video input data stream. The signal VIDEO_OUT may comprise an 8-bit or other bit-depth data stream. In one example, the signal VIDEO_OUT may comprise a video output data stream. The signal VIDEO_OUT may be configured to drive new generation display technology, such as LCD or Plasma displays. The circuit 100 may be configured to generate the signal VIDEO_OUT in response to the signal VIDEO_IN.

In one example, the circuit 100 may comprise a circuit 106 and a circuit 108. The circuit 106 may be implemented as a processor circuit. In one example, the circuit 106 may comprise a media processor. The circuit 108 may be implemented as a storage device. In one example, the circuit 108 may comprise one or more memory devices (e.g., dynamic random access memory (DRAM), double data rate (DDR) DRAM, etc.). However, other types of storage devices (e.g., hard drive, DVD, etc.) may be implemented to the design criteria of a particular implementation.

The circuit 106 may have a first input that may receive the signal VIDEO_IN, a first output that may present a signal (e.g., DMA_HI_OUT), a second output that may present a signal (e.g., DMA_LO_OUT), a second input that may receive a signal (e.g., DMA_HI_IN), a third input that may receive a signal (e.g., DMA_LO_IN), a fourth input that may receive a signal (e.g., COMP_IN), a third output that may present a signal (e.g., COMP_OUT) and a fifth input that may receive a signal (e.g., BITSTREAM). As would be apparent to those skilled in the relevant art(s), the signals illustrated in FIG. 1 represent logical data flows. The logical data flows are generally representative of physical data transferred between the circuit 106 and the circuit 108 by, for example, address, data, and control signals and/or busses. The system represented by the circuit 100 may be implemented in hardware, software or a combination of hardware and software according to the teachings of the present disclosure, as would be apparent to those skilled in the relevant art(s).

In one example, the circuit 108 may be configured to couple (or interface) to the circuit 106. In another example, the circuit 106 may be configured to interface with the circuit 108. The circuit 108 may have a first input that may receive the signal DMA_HI_OUT, a second input that may receive the signal DMA_LO_OUT, a first output that may present the signal DMA_HI_IN, a second output that may present the signal DMA_LO_IN, a third output that may present the signal COMP_IN, a third input that may receive the signal COMP_OUT and a fourth output that may present the signal BITSTREAM. In one example, the signal BITSTREAM may comprise data received in the signal COMP_OUT.

The signal DMA_HI_OUT may comprise a number of most significant bits (MSB) of the signal VIDEO_IN. For example, the signal DMA_HI_OUT generally comprises the eight most significant bits of each data sample (e.g., pixel) of the signal VIDEO_IN. The signal DMA_LO_OUT may comprise a number of least significant bits (LSB) for a number of data samples of the signal VIDEO_IN. For example, each byte of the signal DMA_LO_OUT may comprise two least significant bits for each of four data samples (for a 10-bit signal VIDEO_IN) or four least significant bits for each of two data samples (for a 12-bit signal VIDEO_IN). The signals DMA_HI_OUT and DMA_LO_OUT may further comprise independent pointers for controlling storage of the respective data by the circuit 108. The signal DMA_HI_IN generally comprises the eight most significant bits of a multi-bit (e.g., 8-bit, 10-bit, 12-bit, etc.) data sample. The signal DMA_LO_IN may comprise least significant bits (LSB) of a number of data samples packed 8-bits wide.

The signal COMP_IN generally comprises the eight most significant bits of one or more multi-bit data samples. The signal COMP_OUT generally comprises a compressed bit stream generated in response to the signal COMP_IN. In one example, the signal COMP_OUT may be compliant with one or more predetermined compression standards (e.g., MPEG-2, MPEG-4, H.263, H.264, etc.). The signal BITSTREAM may comprise a compressed data bit stream compliant with one or more predetermined compression standards (e.g., MPEG-2, MPEG-4, H.263, H.264, etc.).

Figure 2:
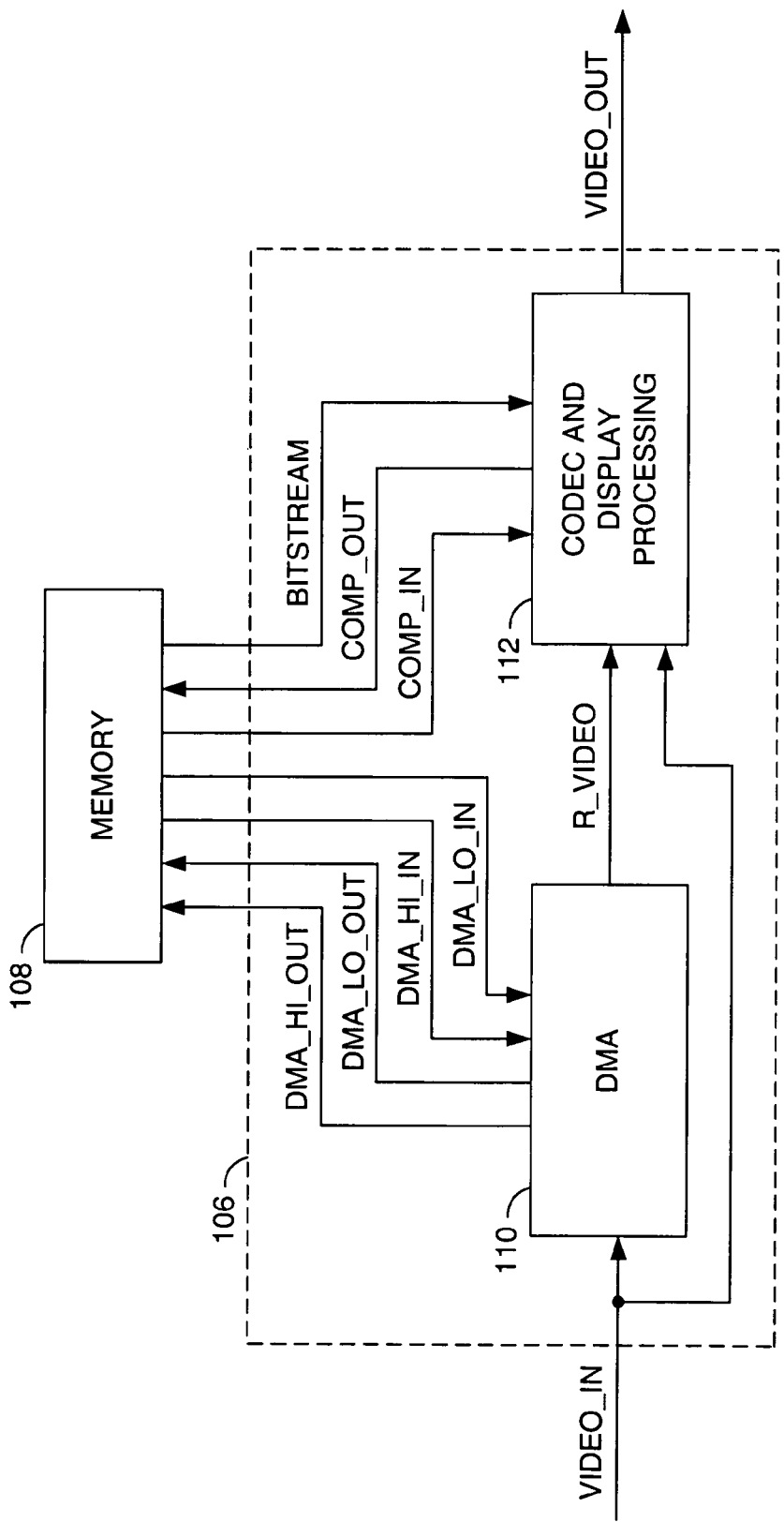
FIG. 2 is a detailed block diagram illustrating a processor in accordance with a preferred embodiment of the present invention.

Referring to FIG. 2, a detailed block diagram is shown illustrating an example of an embodiment of the circuit 106 of FIG. 1 in accordance with a preferred embodiment of the present invention. In one example, the circuit 106 may comprise a circuit (or block) 110 and a circuit (or block) 112. The circuit 110 may be implemented, in one example, as a direct memory access (DMA) circuit (or engine). The circuit 112 may be implemented, in one example, as a compression/decompression (CODEC) and display processing circuit.

The circuit 110 may have a first input that may receive the signal VIDEO_IN, a second input that may receive the signal DMA_HI_IN, a third input that may receive the signal DMA_LO_IN, a first output that may present the signal DMA_HI_OUT, a second output that may present the signal DMA_LO_OUT and a third output that may present a signal (e.g., R_VIDEO). The signal R_VIDEO may comprise multi-bit video (or other) data. The circuit 110 may be configured to generate the signals DMA_HI_OUT and DMA_LO_OUT in response to the signal VIDEO_IN. The circuit 110 may be configured to generate the signal R_VIDEO in response to the signals DMA_HI_IN and DMA_LO_IN. In one example, the signal R_VIDEO may comprise multi-bit data reconstructed (or recovered, or reassembled) from the signals DMA_HI_IN and DMA_LO_IN. For example, the signal R_VIDEO may comprise a time-delayed version of the signal VIDEO_IN.

The circuit 112 may have a first input that may receive the signal VIDEO_IN, a second input that may receive the signal R_VIDEO, a third input that may receive the signal COMP_IN, a fourth input that may receive the signal BITSTREAM, a first output that may present the signal COMP_OUT and a second output that may present the signal VIDEO_OUT. The circuit 112 may be configured to generate the signal VIDEO_OUT in response to one or more of the signals VIDEO_IN, R_VIDEO and BITSTREAM. The circuit 112 may be configured to generate the signal COMP_OUT in response to the signal COMP_IN.

Figure 3:
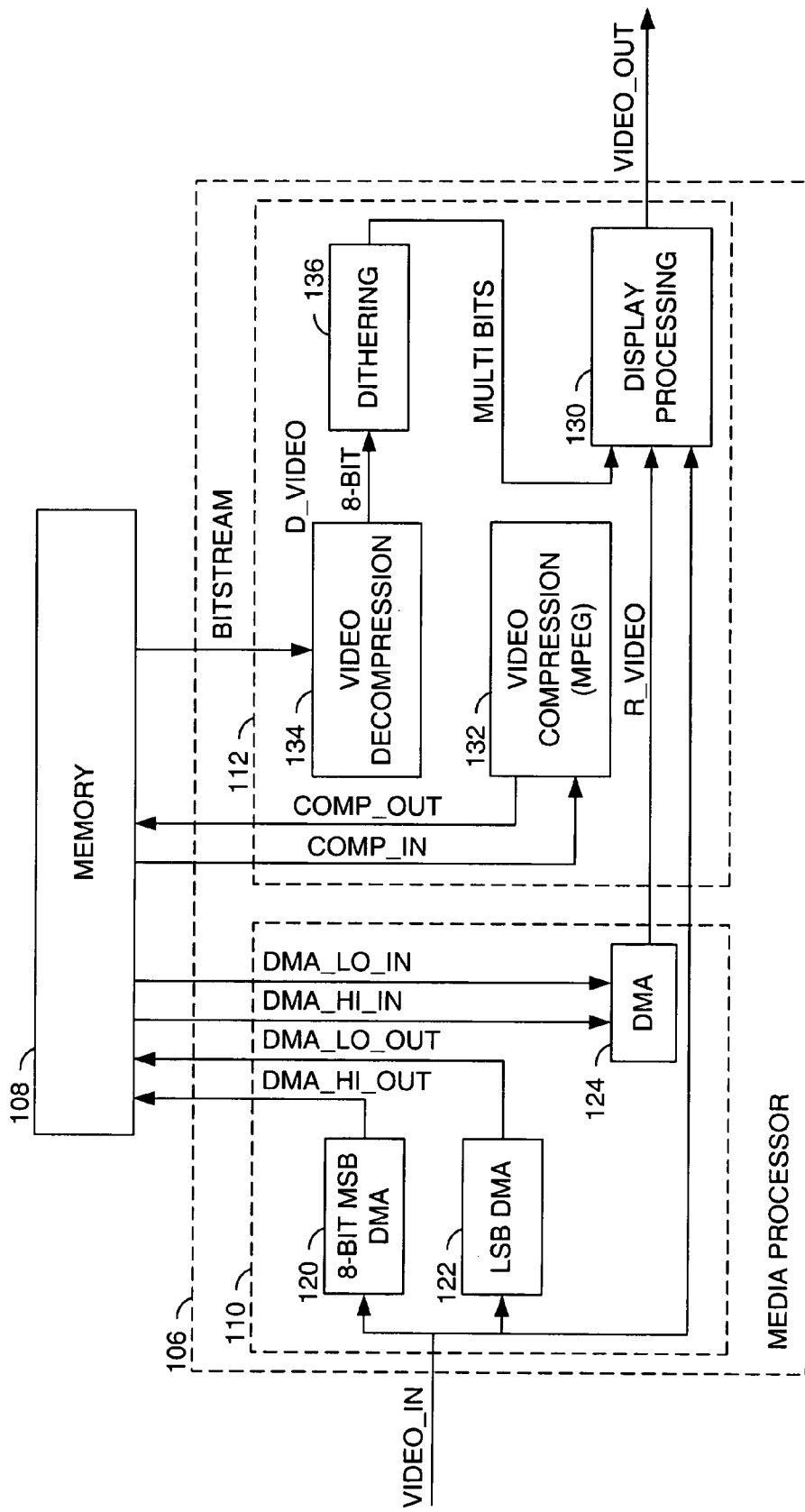
FIG. 3 is a more detailed block diagram illustrating a processor in accordance with another preferred embodiment of the present invention.

Referring to FIG. 3, a more detailed block diagram is shown illustrating an example of another embodiment of the circuit 106 in accordance with another preferred embodiment of the present invention. In one example, the circuit 110 may comprise a circuit (or block) 120, a circuit (or block) 122 and a circuit (or block) 124. In one example, the circuit 112 may comprise a circuit (or block) 130, a circuit (or block) 132, a circuit (or block) 134 and a circuit (or block) 136. The circuit 120 may be implemented, in one example, as a DMA engine. The circuit 122 may be implemented, in one example, as a DMA engine. The circuit 124 may be implemented, in one example, as a DMA engine. The circuit 130 may be implemented, in one example, as a display processing circuit. The circuit 132 may be implemented, in one example, as a video compression circuit. In one example, the circuit 132 may be implemented as a standard compliant (e.g., MPEG, H.264, etc.) compression circuit (or device). The circuit 134 may be implemented, in one example, as a video decompression circuit. In one example, the circuit 134 may be implemented as a standard compliant (e.g., MPEG, H.264, etc.) decompression circuit (or device). The circuit 136 may be implemented, in one example, as a dithering circuit. The blocks 120-136 may be implemented using conventional techniques and the teachings of the present disclosure.

The signal VIDEO_IN may be presented to an input of the circuit 120, an input of the circuit 122 and a first input of the circuit 130. The circuit 120 may have an output that may present the signal DMA_HI_OUT. In one example, the circuit 120 may comprise an 8-bit DMA engine configured to manipulate the eight most significant bits (MSBs) of each pixel in the signal VIDEO_IN. The circuit 122 may have an output that may present the signal DMA_LO_OUT. In one example, the circuit 122 may be configured to manipulate (e.g., pack) the remaining least significant bits (LSBs) of each pixel in the signal VIDEO_IN. For example, the circuit 122 may be configured to pack LSBs from two or more pixels into a single byte. The circuits 120 and 122 may be configured to generate independent pointers to independent buffers implemented in the circuit 108. The circuit 124 may have a first input that may receive the signal DMA_HI_IN, a second input that may receive the signal DMA_LO_IN and an output that may present the signal R_VIDEO to a second input of the circuit 130. The circuit 124 may be configured to generate pointers for accessing the buffers implemented in the circuit 108.

The video (or other) input data of the signal VIDEO_IN may be separated by the circuit 110 into a first portion comprising the 8 MSBs and a second portion comprising the remaining LSBs. For example, the 8 MSBs may be separated and then packed together as data bytes and sent to the memory 108 by the DMA engine 120. The LSB may also be extracted and packed together as a data byte and sent to the memory 108 by the DMA engine 122. For example, in a 10-bit video system, the extra 2 LSBs of 4 pixels may be packed to form a single byte and sent to the memory 108.

The circuit 132 may have an input that may receive the signal COMP_IN and an output that may present the signal COMP_OUT. The circuit 132 may be configured to generate the signal COMP_OUT from the signal COMP_IN using one or more compression standards (e.g., MPEG-2, MPEG-4, H.264, etc.). The circuit 134 may have an input that may receive the signal BITSTREAM and an output that may present a signal (e.g., D_VIDEO) to an input of the circuit 136. The circuit 134 may be configured to decompress (or decode) the signal BITSTREAM in accordance with one or more decompression standards (e.g., MPEG-2, MPEG-4, H.264, etc.). The signal D_VIDEO may comprise an uncompressed 8-bit video signal.

The circuit 136 may have an output that may present a multi-bit data signal (e.g., MULTI-BITS) to a third input of the circuit 130. In one example, the signal MULTI_BITS may comprise a multi-bit video signal. In one example, the signal MULTI_BITS has a greater bit-depth than the signal D_VIDEO. In one example, the circuit 136 may be configured to add random noise to the least significant bits of the pixels in the signal MULTI_BITS to improve the appearance of the pixels when displayed. For example, decoding an MPEG compressed signal provides 8-bit data. If zeroes are added as the least significant bits, discrete steps may be visible on the display. A contour may be seen if the data is for a 2D image. By adding random noise to the least significant bits, the steps and/or contour effect may be hidden (obscured). In another example, the circuit 136 may be configured to add zeroes as the least significant bits and perform horizontal and vertical filtering. In one example, a sort of bank notch filtering may be implemented to filter out noise (e.g., the contour effect) in a predetermined frequency range.

The circuit 130 may have an output that may present the signal VIDEO_OUT. The circuit 130 may be configured to select between the signals VIDEO_IN, R_VIDEO and MULTI_BITS as a source for generating the signal VIDEO_OUT. In one example, the circuit 130 may be user programmable. In one example, the circuit 130 may comprise one or more circuits (or blocks) such as a de-interlacer (e.g., for a source of 480i or 1080i), a noise reduction filter, a vertical and horizontal scaler (e.g., for adjusting the input image to the output display panel), a mixer (e.g., for combining the video plane, OSD, etc.), a raster timing controller, a format converter (e.g., 422 to 444, etc.), a gamma correction circuit, and/or a panel output controller.

The circuit 132 and the circuit 134 may be configured to access only the data buffer in the memory 108 containing the 8 MSBs. Since the MSBs data is stored separately from the LSBs data, future expansion of data bit-depth (e.g., to 12-bit, 14-bit, etc.) may be transparent to the circuits 132 and 134. The circuit 136 may be configured to use a dithering method, when displaying decompressed 8-bit video, to expand the 8-bit video to the full data depth of an attached display. Dithering may be done by inserting extra random LSBs to the 8-bit data. The advantage of dithering is to hide the quantization noise. For example, a ramp up video signal may be seen as discrete steps on high contrast plasma panels. The circuit 136 may be configured to effectively conceal such a "staircase" artifact.

In one example, the circuit 106 may be configured to support direct video display from the memory buffer 108. In one example, the memory 108 may be used as a buffer (e.g., time delay) for the input signal VIDEO_IN. In such a case, the DMA engine 124 may be configured to separately access both MSBs and LSBs data and recombine the data to full depth before displaying.

Figure 4:
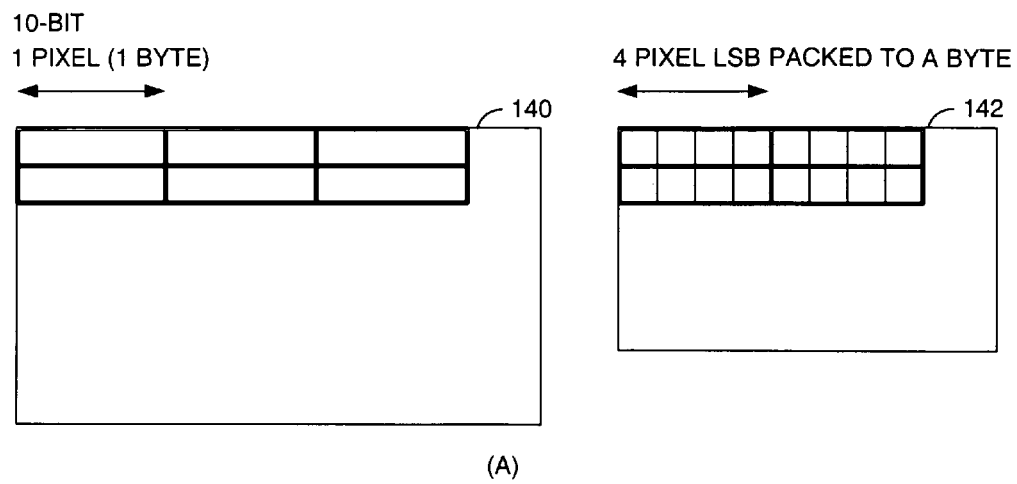
FIGS. 4(A-B) are block diagrams illustrating memory buffer structures in accordance with preferred embodiments of the present invention.
Figure 4:
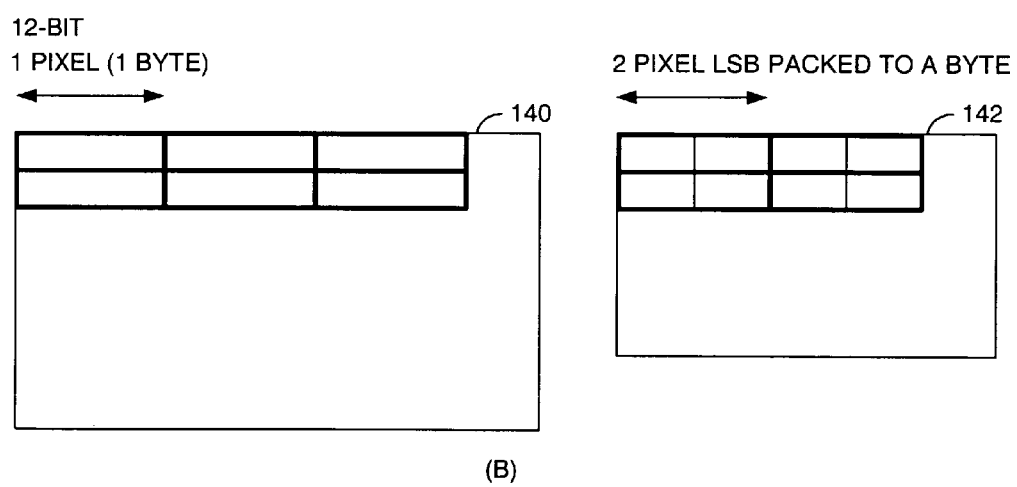

Referring to FIGS. 4(A-B), block diagrams are shown illustrating example memory data structures in accordance with a preferred embodiment of the present invention. In one example, the system 100 may be configured for a 10-bit video input signal. When the system 100 is configured for 10-bit video input signal, a memory data structure may be implemented such that the data is stored in 8-bit (byte) quantities (e.g., FIG. 4A). For example, when the data structure implemented is 10-bits wide, the 8 most significant bits of a video pixel may be stored as one byte in a first buffer 140 and the 2 least significant bits of four pixels may be combined and stored as a single byte in a second buffer 142.

In another example, the system 100 may be configured for a 12-bit video input signal. When the system 100 is configured for 12-bit video input signal, a memory data structure may be implemented such that the data is stored in 8-bit (byte) quantities (e.g., FIG. 4B). For example, when the data structure implemented is 12-bits wide, the 8 most significant bits of a video pixel may be stored as one byte in the buffer 140 and the 4 least significant bits of two pixels may be combined and stored as a single byte in the buffer 142.

The data structure stored in the memory 108 generally has separate buffers for the 8 MSBs and the remaining LSBs. In one example, the two buffers may be stored as 2-dimensional strip buffers to enable efficient MPEG motion compensation access. In one example, access may be achieved with a small 16×16 or 8×8 2-dimensional strip.

The present invention generally provides a system that may effectively deal with video data depth beyond 8-bit while maintaining efficient handling of 8-bit data. The present invention may provide advantages that may include providing an architecture that is ready for future expansion, providing effective memory bandwidth usage, providing decompressed data expansion and providing simple data format conversion. For example, increasing the video from 10-bit to 12-bit generally involves changing only the DMA engine. The major modules such as MPEG compression/decompression engines are untouched. Each module may be configured to fetch the minimum data for performing the respective operation. 8-bit MPEG video may be expanded efficiently to hide the quantization noise and other artifact. 8-bit and multi-bit data may be exchanged and packing/unpacking performed with simple DMA engine logic because upper and lower bit data are stored independently in memory.

The functions performed by the data flow diagrams of FIGS. 1-3 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of application specific integrated circuits (ASICs), field programmable gate arrays (FPGAs), or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a processor configured to
   (a) process pixel data comprising eight or more bits, wherein for pixel data having bit-depths greater than eight bits, a number of most significant bits (MSBs) of a pixel are presented as a first byte and a number of least significant bits (LSBs) of said pixel are packed with LSBs from one or more other pixels into a second byte, and the first and the second bytes are stored,
   (b) retrieve said first byte and said second byte and reassemble the pixel data having bit-depths greater than eight bits from said first byte and said second byte,
   (c) retrieve the stored first bytes, generate a compressed bitstream using only the first bytes, and store said compressed bitstream, wherein said compressed bitstream comprises at least one of (i) a MPEG-2 compliant compressed bitstream, (ii) a MPEG-4 compliant compressed bitstream, and (iii) a H.264 compliant compressed bitstream,
   (d) retrieve said compressed bitstream and generate a multi-bit data stream having a bit-depth greater than eight bits using said compressed bitstream, and
   (e) generate a video output signal in response to (i) the original pixel data in a first mode, (ii) the reassembled pixel data in a second mode, and (iii) the multi-bit data stream in a third mode; and
a memory coupled to said processor and configured to store said first byte in response to a first pointer and said second byte in response to a second pointer, wherein said first byte and said second byte are stored independently in said memory and said memory is further configured to store said compressed bitstream.

2. The apparatus according to claim 1, wherein said apparatus is part of a video processing data path.

3. The apparatus according to claim 1, wherein said second byte comprises two LSBs from four pixels for 10-bit pixel data and four LSBs from two pixels for 12-bit pixel data.

4. The apparatus according to claim 1, wherein said memory comprises a first buffer configured to store a plurality of first bytes and a second buffer configured to store a plurality of second bytes.

5. The apparatus according to claim 1, wherein said processor comprises a direct memory access engine configured to partition said pixel data into said first byte and said second byte.

6. The apparatus according to claim 5, wherein said direct memory access engine is further configured to reassemble said pixel data from said first byte and said second byte.

7. The apparatus according to claim 1, wherein said processor comprises:
   a compression circuit configured to generate said compressed bitstream from only the first bytes read from said memory and store said compressed bitstream in said memory; and
   a decompression circuit configured to generate an 8-bit data stream in response to said compressed bitstream read from said memory.

8. The apparatus according to claim 7, wherein said processor further comprises:
   a dithering circuit configured to generate said multi-bit data stream by expanding said 8-bit data stream to said bit-depth greater than 8-bits, wherein said bit depth greater than 8-bits corresponds to a data depth of an attached display.

9. The apparatus according to claim 8, wherein said dithering circuit is configured to generate said multi-bit data stream by adding random noise as the least significant bits of said multi-bit data stream.

10. The apparatus according to claim 1, wherein said processor comprises:
   a first DMA engine configured (i) to process the pixel data comprising eight or more bits, wherein for pixel data having bit-depths greater than eight bits, a number of most significant bits (MSBs) of a pixel are presented as a first byte, a number of least significant bits (LSBs) of said pixel are packed with LSBs from one or more other pixels into a second byte and (ii) to store the first byte and the second byte in the memory;
   a second DMA engine configured to retrieve said first and second bytes and reassemble the pixel data having a bit-depth greater than eight bits from said first byte and said second byte;
   a compression/decompression (CODEC) circuit configured (i) to generate said compressed bitstream from only the first bytes and store said compressed bitstream in the memory and (ii) to retrieve said compressed bitstream from the memory and generate an 8-bit data stream from said compressed bitstream;
   a dithering circuit configured to generate said multi-bit data stream by expanding said 8-bit data stream to said bit-depth greater than eight bits; and
   a display processor configured to generate said video output signal in response to (i) said original pixel data in said first mode, (ii) the reassembled pixel data in said second mode and (iii) said multi-bit data stream in said third mode.

11. The apparatus according to claim 10, wherein said compression/decompression (CODEC) circuit comprises a video CODEC compliant with one or more compression standards selected from the group consisting of MPEG-2, MPEG-4, and H.264.

12. A video processing data path comprising:
means for processing pixel data comprising eight or more bits, wherein for pixel data having bit-depths greater than eight bits, a number of most significant bits (MSBs) of a pixel are presented as a first byte and a number of least significant bits (LSBs) of said pixel are packed with LSBs from one or more other pixels into a second byte;
means for storing said first byte according to a first pointer and said second byte according to a second pointer, wherein said first byte and said second byte are stored independently in a memory;
means for retrieving said first and second bytes from said memory and reassembling the pixel data having bit-depths greater than eight bits from the first and second bytes;
means for retrieving the first bytes from said memory, generating a compressed bitstream using only the first bytes, and storing said compressed bitstream in said memory, wherein said compressed bitstream comprises at least one of (i) a MPEG-2 compliant compressed bitstream, (ii) a MPEG-4 compliant compressed bitstream, and (iii) a H.264 compliant compressed bitstream;
means for retrieving said compressed bitstream from said memory and generating a multi-bit data stream having a bit-depth greater than eight bits using said compressed bitstream; and
means for generating a video output signal in response to (i) the original pixel data in a first mode, (ii) the reassembled pixel data in a second mode and (iii) the multi-bit data stream in a third mode.

13. A method for processing multi-depth video data comprising the steps of:
processing pixel data comprising eight or more bits, wherein for pixel data having bit-depths greater than eight bits, a number of most significant bits (MSBs) of a pixel are presented as a first byte and a number of least significant bits (LSBs) of said pixel are packed with LSBs from one or more other pixels into a second byte;
storing said first byte according to a first pointer and said second byte according to a second pointer, wherein said first byte and said second byte are stored independently in a memory;
retrieving said first and second bytes from said memory and reassembling the pixel data having bit-depths greater than eight bits from said first byte and said second byte;
retrieving only the first bytes from said memory, generating a compressed bitstream using only the first bytes and a video compressor/decompressor (CODEC), and storing said compressed bitstream in said memory, wherein said compressed bitstream comprises at least one of (i) a MPEG-2 compliant compressed bitstream, (ii) a MPEG-4 compliant compressed bitstream, and (iii) a H.264 compliant compressed bitstream;
retrieving said compressed bitstream from said memory and generating a multi-bit data stream having a bit-depth greater than eight bits using said compressed bitstream; and
generating a video output signal in response to (i) the original pixel data in a first mode, (ii) the reassembled pixel data in a second mode and (iii) the multi-bit data stream in a third mode.

14. The method according to claim 13, wherein said second byte comprises two LSBs from four pixels for 10-bit pixel data and four LSBs from two pixels for 12-bit pixel data.

15. The method according to claim 13, wherein said memory comprises a first buffer configured to store a plurality of first bytes and a second buffer configured to store a plurality of second bytes.

16. The method according to claim 13, wherein the step of generating the multi-bit data stream having said bit-depth greater than eight bits comprises the steps of:
reading said compressed bitstream from said memory; and
generating an 8-bit data stream in response to said compressed bitstream.

17. The method according to claim 16, further comprising the steps of:
generating the multi-bit data stream from said 8-bit data stream using dithering, wherein said dithering expands said 8-bit data stream to said bit-depth greater than eight bits.

18. The method according to claim 17, wherein said dithering comprises adding random noise to the least significant bits of said multi-bit data stream.

19. The method according to claim 17, wherein said dithering comprises adding random least significant bits to the pixel data of the 8-bit data stream.

20. The method according to claim 17, wherein said dithering comprises performing horizontal and vertical filtering on said multi-bit data stream after adding zeroes as the least significant bits of said multi-bit data stream.

* * * * *